Figure 3:
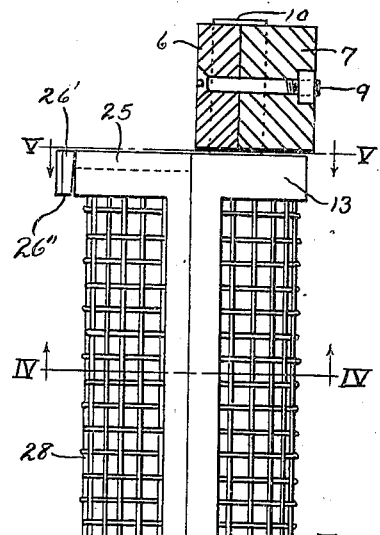

Feb. 13, 1923.
E. S. ELLIOTT
EGG TURNING MEANS FOR INCUBATORS
Filed Feb. 11, 1922
1,444,783
2 sheets-sheet 1
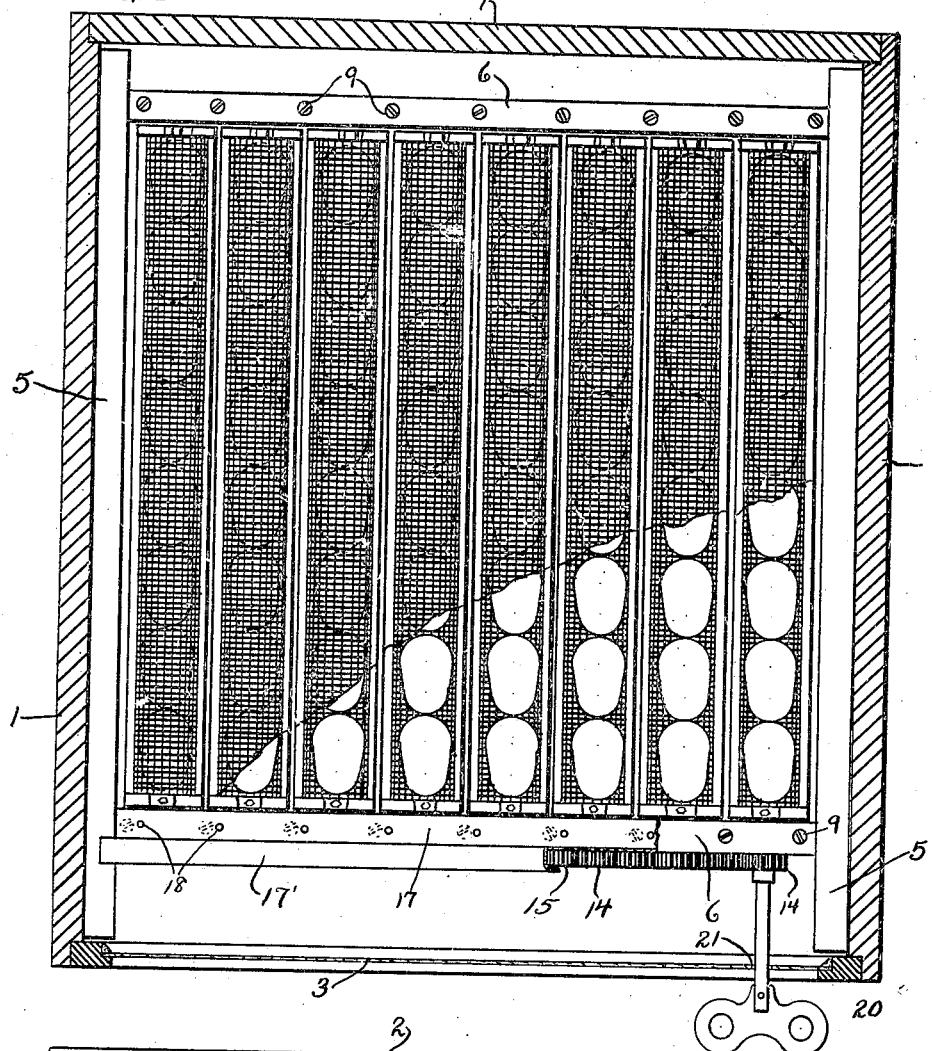
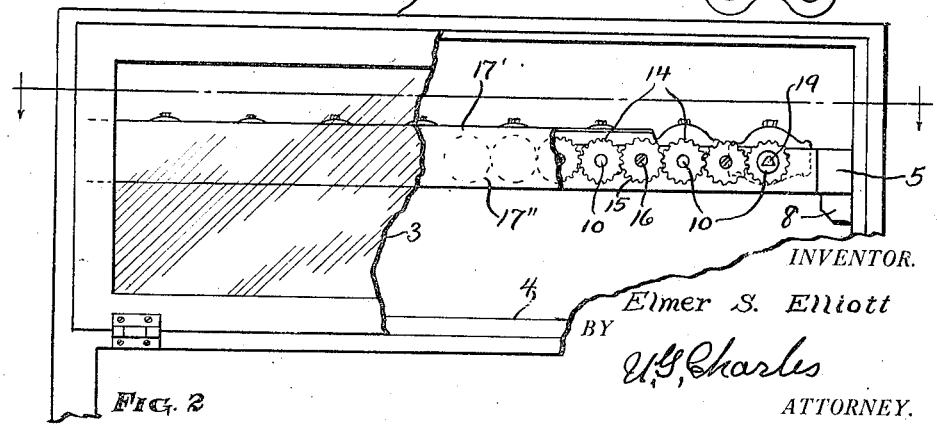
INVENTOR.
Elmer S. Elliott
BY
U.G. Charles
ATTORNEY.

Feb. 13, 1923.

E. S. ELLIOTT

EGG TURNING MEANS FOR INCUBATORS

Filed Feb. 11, 1922

1,444,783

2 sheets-sheet 2

INVENTOR.
Elmer S. Elliott
BY
E. G. Charles
ATTORNEY.

Patented Feb. 13, 1923.

1,444,783

UNITED STATES PATENT OFFICE.

ELMER S. ELLIOTT, OF WICHITA, KANSAS.

EGG-TURNING MEANS FOR INCUBATORS.

Application filed February 11, 1922. Serial No. 535,801.

*To all whom it may concern:*

Be it known that I, ELMER S. ELLIOTT, a citizen of the United States, and resident of Wichita, in the county of Sedgwick and State of Kansas, have invented a certain new and useful Improvement in Egg-Turning Means for Incubators, of which the following is a specification, reference being had to the drawings forming a part thereof.

This invention relates to incubators, and specifically, to a mechanical means for turning the eggs; the purpose of such turning being well known in the art and not requiring explanation.

The advantages over turning by hand, attained by the use of this invention, are, in part, as follows:

The eggs are turned more quickly than they are turned by hand;

The eggs are turned more accurately than they are turned by hand;

The danger of egg breakage by hand turning is obviated;

The eggs are mechanically turned without removing the tray or trays from the incubator, hence, without exposing the eggs to the cooler outside temperature.

A preferred embodiment of my improvement is shown in the drawings, wherein:—

Figure 5:
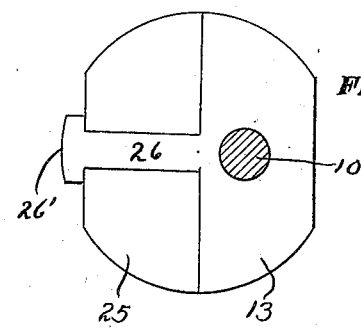
Figures 7, 8:
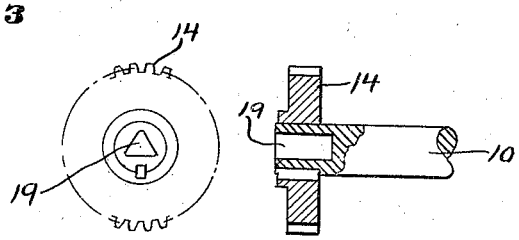
Figure 6:
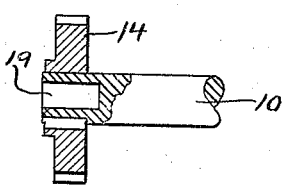
Figure 4:
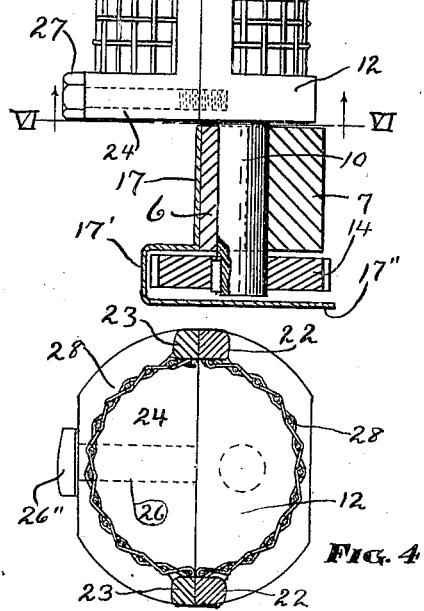

Fig. 1 is a plan view of the improvement showing the egg-holders in plan and partly broken away, and the upper part of an incubator in section, the holders being filled; Fig. 2 is a front elevation of the parts shown by Fig. 1, certain parts being broken away for clearness; Fig. 3 is a broken detail plan view of one of the egg-holders, with bearings and gear in section; Fig. 4 is a section viewed on line IV—IV of Fig. 3; Fig. 5 is a section viewed on line V—V of Fig. 3; Fig. 6 is a section viewed on line VI of Fig. 3, with portions of other parts in part-section; Figs. 7 and 8 are detail views of the key-actuated gear wheel.

The upper portion of the case of an incubator (of any style) as shown on Figs. 1 and 2, comprises the upright walls 1, the top 2, and a glass door 3. There is also a shelf 4, at a suitable distance below the egg-holders, to receive the newly hatched chicks.

The egg-holders are mounted in a rectangular tray comprising bars 5, 6, 7; the ends of bars 6, 7 being secured to bars 5. Tray-bars 5 are slidably mounted on strips 8, secured to the case-walls 1. By opening the door 3, the tray may be drawn out for placing or removing eggs.

Bars 6 are fastened to bars 7 with bolts 9 (see Fig. 3) and by drilling a series of holes, half of each hole in the bars 6 and half in bars 7, bearings are formed for the pivots 10 of the egg-holders. These pivots are in the form of stub-shafts mounted on the ends of metal end-pieces 12, 13, respectively.

Keyed upon the front pivot of each egg-holder is a gear wheel 14. The train of gears is completed by a series of intermediate gears 15, mounted on stub-shafts 16, clamped between the front tray-members 6 and 7.

The train of gears is covered and shielded by any suitable form of housing. As shown, a strip of sheet metal formed with a base 17, a channeled portion 17' and a front depending portion 17'' serves this purpose. The base 17 is secured to strip 6 by screws 18.

One of the gears 14 or 15 is provided with a non-circular socket 19, to receive a key 20, by which the whole train of gears may be rotated. To permit the insertion of said key, a hole 21 is cut through the glass or door 3, as shown.

The structure of the egg-holders, in the form shown, will now be described. For each egg-holder there is a metal frame which is constructed in two longitudinally divided parts, as clearly shown by Figs. 3 and 4. Part 22 of each holder comprises the two end-pieces 12, 13 and the longitudinal bars 22. Part 23 of each holder comprises the two end-pieces 24, 25 and the longitudinal bars 23 and the bars 23 are integral with the two end-pieces 24 and 25. The rear end-piece 25 is radially slotted to receive a radial finger 26, integral with the companion piece 13. On the end of said finger is a T head 26' having an integral, forwardly projecting lug 26'' thereon. This lug is tapered on its inner face, as shown on Fig. 3. In assembling the holder, the upper end-piece 25 is slipped horizontally beneath this lug 26'', which draws the part 25 down into close contact with the companion part 13. The halves of the holder-frame are then fastened together by means of a screw 27, passing freely through a hole in part 24 and into a threaded hole in part 12.

Of course, I do not limit myself to the type, style or form of fastening devices just described.

The body of each egg-holder may be made of any suitable foraminous material. In the drawing I have shown woven wire, of coarse mesh, formed in two troughs of semicircular cross-section. These are secured to the frames above described by soldering, or any preferred means.

About two days before a batch of eggs are due to hatch out, I take off the removable half of each egg-holder, but still maintain the source of heat in the incubator. This leaves the eggs cradled in the lower parts of the wire holders. When a chick emerges from its shell it will climb over any intervening shells to reach the step formed by the strip 17, then will drop on to the plate 4, which I have termed a "shelf" but which is really the floor of the incubator or of the egg-chamber. This floor may be perforated to admit the warm air from a heater below; but if it be imperforate, the warm air will be otherwise admitted to and drawn from the egg chamber.

It will be observed that I show the pivots 10 eccentrically. My object therein is to provide for so adjusting the egg-holders as to raise their lower halves relative to the step 17, so that the newly-hatched chicks will be able to pass from the holders on to said step, (and thence to the floor).

By inserting the key in socket 19 and turning it, all of the egg-holders will simultaneously be turned.

Though I have described a desirable construction, I wish it understood that any mechanical equivalents, either of single parts or parts in combination, properly fall within the scope of this invention as claimed.

Having described my invention, what I claim as new and desire to secure by Letters Patent, is:

In an incubator egg-holder, a metal frame comprising two similar parts, each part comprising a pair of longitudinal parallel bars and integral end-pieces; means integral with the end-pieces at one end of the frame for holding said two parts of the frame together, and a screw engaging the opposite end-pieces for holding said two parts together at the end opposite said integral means.

In testimony whereof, I hereto affix my signature.

ELMER S. ELLIOTT.